United States Patent
Brun-Buisson et al.

(10) Patent No.: US 10,170,733 B2
(45) Date of Patent: Jan. 1, 2019

(54) FLEXIBLE STRUCTURE WITH STRAIN GAUGE, APPLICATION TO ELECTROCHEMICAL LITHIUM-ION BATTERIES IN A FLEXIBLE PACKAGING

(71) Applicant: COMMISSARIAT A L'ENERGIE ATOMIQUE ET AUX ENERGIES ALTERNATIVES, Paris (FR)

(72) Inventors: David Brun-Buisson, Vatilieu (FR); Sylvie Genies, Saint-Egrève (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 82 days.

(21) Appl. No.: 15/127,669

(22) PCT Filed: Mar. 17, 2015

(86) PCT No.: PCT/IB2015/051961
§ 371 (c)(1),
(2) Date: Sep. 20, 2016

(87) PCT Pub. No.: WO2015/140721
PCT Pub. Date: Sep. 24, 2015

(65) Prior Publication Data
US 2017/0141360 A1 May 18, 2017

(30) Foreign Application Priority Data
Mar. 19, 2014 (FR) ..................................... 14 52264

(51) Int. Cl.
*G01L 5/00* (2006.01)
*H01M 2/02* (2006.01)
(Continued)

(52) U.S. Cl.
CPC ............ *H01M 2/0275* (2013.01); *G01B 7/16* (2013.01); *G01B 7/18* (2013.01); *H01M 2/0207* (2013.01);
(Continued)

(58) Field of Classification Search
CPC ........... H01M 2/0275; H01M 10/0525; H01M 10/48; G01B 7/18
(Continued)

(56) References Cited

U.S. PATENT DOCUMENTS 5,166,892 A * 11/1992 Inoue ....................... G01D 3/02
                                                              324/130
7,335,448 B2    2/2008 Kaito et al.
(Continued)

FOREIGN PATENT DOCUMENTS

DE        102007063188 A1    6/2009
FR            2331775 A1     6/1977
(Continued)

OTHER PUBLICATIONS

International Search Report dated Jun. 24, 2015 for PCT/IB2015/051961.

*Primary Examiner* — Max Noori
(74) *Attorney, Agent, or Firm* — Pearne & Gordon LLP

(57) ABSTRACT

The present invention relates to a flexible structure (6) comprising a strain gauge (7) that is elongate along a longitudinal axis X1, and intended to measure the deformation of the flexible structure in a direction X parallel to the axis X1, the strain-gauge support (71) being bonded to the flexible structure only via the lateral ends (75, 76) thereof. One particularly targeted application is the bonding of strain tool gauges to the packaging of a flexible lithium battery, such as an Li-ion battery.

6 Claims, 2 Drawing Sheets

(51) Int. Cl.
  *G01B 7/16* (2006.01)
  *H01M 2/10* (2006.01)
  *H01M 10/0525* (2010.01)
  *H01M 10/48* (2006.01)

(52) U.S. Cl.
  CPC ....... *H01M 2/0267* (2013.01); *H01M 2/1016* (2013.01); *H01M 2/1072* (2013.01); *H01M 10/0525* (2013.01); *H01M 10/48* (2013.01)

(58) Field of Classification Search
  USPC .......................................................... 73/774
  See application file for complete search history.

(56) References Cited

U.S. PATENT DOCUMENTS

| | | |
|---|---|---|
| 7,338,733 B2 | 3/2008 | Morita et al. |
| 7,348,098 B2 | 3/2008 | Hayashi et al. |
| 2005/0028656 A1* | 2/2005 | Hsien .................. B25B 23/1425 81/467 |
| 2006/0090575 A1* | 5/2006 | Hsieh ........................ G01L 5/24 73/862.623 |
| 2006/0121348 A1 | 6/2006 | Mizutani et al. |
| 2008/0057392 A1 | 3/2008 | Takamatsu et al. |
| 2008/0060189 A1 | 3/2008 | Daidoji et al. |
| 2012/0286739 A1 | 11/2012 | O'Brien, Jr. et al. |
| 2016/0072158 A1 | 3/2016 | Genies et al. |

FOREIGN PATENT DOCUMENTS

| | | |
|---|---|---|
| FR | 2955974 A1 | 8/2011 |
| FR | 2972857 A1 | 9/2012 |
| FR | 3004856 | 10/2014 |

* cited by examiner

FLEXIBLE STRUCTURE WITH STRAIN GAUGE, APPLICATION TO ELECTROCHEMICAL LITHIUM-ION BATTERIES IN A FLEXIBLE PACKAGING

TECHNICAL FIELD

The present invention relates to the field of measurement of the deformation of a flexible structure by means of at least one strain gauge adhesively bonded to said structure.

It more particularly relates to a novel way of adhesively bonding a strain gauge to the flexible structure for which it is sought to determine the deformation to which it is subject.

The main application targeted by the invention is the measurement of the deformation of the flexible packaging of lithium electrochemical accumulators such as Li-ion accumulators.

The invention thus relates to a lithium electrochemical accumulator including at least one electrochemical cell consisting of at least one anode and one cathode on either side of an electrolyte, two current collectors, one of which is connected to the anode and the other to the cathode, and a flexible packaging arranged to contain the electrochemical cell(s) with seal-tightness while being passed through by portions of the current collectors forming the poles.

Although described below with reference to the main application, the invention is also applicable to any other flexible structure for which it is sought to measure the deformation to which it is subject by means of a strain gauge.

By "flexible structure", what is meant is a mechanical structure the constituent material(s) of which is (are) flexible, i.e. material(s) deformable with low stresses; i.e. of low Young's modulus. By way of example, a structure made of polymeric material(s) is considered to be flexible when its Young's modulus is lower than 10 GPa.

PRIOR ART

Such as schematically illustrated in FIGS. 1 and 2, a lithium-ion accumulator or battery usually includes at least one electrochemical cell C consisting of an electrolyte constituent 1, impregnated in a separator allowing the electrodes to be electrically isolated, between a positive electrode or cathode 2 and a negative electrode or anode 3, a current collector 4 connected to the cathode 2, a current collector 5 connected to the anode 3 and lastly a packaging 6 arranged to contain the electrochemical cell with seal-tightness while being passed through by portions of the current collectors 4, 5.

The architecture of conventional lithium-ion batteries is an architecture that may be qualified as monopolar, because with a single electrochemical cell including an anode, a cathode and an electrolyte. A number of types of monopolar architecture geometry are known:
 a cylindrical geometry wound about a cylindrical axis such as disclosed in patent application US 2006/0121348;
 a prismatic geometry wound about a parallelepipedal axis such as disclosed in patents U.S. Pat. Nos. 7,348,098 and 7,338,733; and
 a stacked geometry such as disclosed in patent applications US 2008/060189 and US 2008/0057392 and patent U.S. Pat. No. 7,335,448.

The electrolyte constituent 1 may be a solid, liquid or gel. In the latter form, the constituent may comprise a separator made of a polymer, a ceramic or a microporous composite imbibed with organic or liquid-ionic electrolyte(s) that allow lithium ions to move from the cathode to the anode during the charging process and vice versa during the discharging process, thereby generating, in the latter case, a current by forcing electrons to move through the external circuit. The electrolyte is in general a mixture of organic solvents, for example carbonates, to which a lithium salt, typically $LiPF_6$, is added.

The positive electrode or cathode 2 consists of insertion materials of the lithium cation, such as $LiFePO_4$, $LiCoO_2$ or $LiNi_{0.33}Mn_{0.33}CO_{0.33}O_2$.

The negative electrode or anode 3 very often consists of carbon, graphite, or is made of $Li_4TiO_5O_{12}$ (titanate material), though it is also optionally based on silicon or a silicon-based composite.

A negative electrode of a lithium-ion accumulator may be formed from a single alloy, or from a mixture of alloys, or from a mixture of one or more alloys and one or more other lithium insertion materials (graphite in synthetic or natural form, $Li_4Ti_5O_{12}$, $TiO_2$ etc.). This negative electrode may also contain electronically conductive additives and polymeric additives that provide it with mechanical properties and an electrochemical performance that are appropriate for the lithium-ion battery application or to its method of implementation.

The current collector 4 connected to the positive electrode is in general made of aluminum.

The current collector 5 connected to the negative electrode is in general made of copper, of nickel-coated copper or of aluminum.

A lithium-ion accumulator or battery may of course include a plurality of electrochemical cells that are stacked on top of one another.

Conventionally, a Li-ion accumulator or battery uses a pair of materials at the anode and at the cathode that allow it to operate at a high voltage level, typically equal to 3.6 volts.

Depending on the type of application targeted, it is sought to produce either a thin and flexible lithium-ion accumulator, or a rigid accumulator: the packaging is then either flexible or rigid and forms, in the latter case, a casing so to speak.

Flexible packagings are usually manufactured from a multilayer composite consisting of a stack of aluminum layers covered with one or more polymer films laminated by adhesive bonding. In most of these flexible packagings, the polymer covering the aluminum is chosen from polyethylene (PE), polypropylene and polyamide (PA), though it may take the form of an adhesive layer consisting of polyester-polyurethane. Showa Denko sells this type of composite for use as battery packaging under the references NADR-0N25/AL40/CPP40 or No. ADR-0N25/AL40/CPP80.

The Applicant has also proposed an improved flexible packaging based on one or more sheets of polyaryletherketone (PAEK) in patent application FR 2955974.

For their part, rigid packagings (casings) are used when the targeted applications are constraining, when for example very high pressures are to be withstood and a stricter seal-tightness level (typically lower than $10^{-8}$ mbar.l/s) is required, or a long lifetime is sought, or in highly constraining environments such as in the space or aeronautic field. The constituent material of a Li-ion-accumulator casing is usually a metal, typically an aluminum alloy, or made of stainless steel or a rigid polymer such as for example acrylonitrile butadiene styrene (ABS).

During the insertion/deinsertion of the Li+ ion, the crystal cell of the active materials of the negative and positive electrodes expands or contracts, such as for example shown in the table below.

|  | $LiFePO_4$ | | $LiNi_{0.33}Mn_{0.33}Co_{0.33}O_2$ | | Graphite | |
| --- | --- | --- | --- | --- | --- | --- |
|  | De-lithiated | Lithiated | De-lithiated | Lithiated | De-lithiated | Lithiated |
| a (Å) | 5.792 | 6.008 | 2.832 | 2.858 | 2.460 | 2.485 |
| b (Å) | 9.821 | 10.334 | 2.832 | 2.858 | 2.460 | 2.485 |
| c (Å) | 4.788 | 4.683 | 13.938 | 14.223 | 3.350 | 3.706 |
| volume (Å$^3$) | 272.4 | 291.3 | 96.809 | 100.611 | 52.670 | 59.458 |
| variation in volume (%) | +6.5 | | +3.8 | | +11.4 | |

These substantial modifications to the crystal cell of the alloy cannot be absorbed by the intrinsic porosity of the negative electrode. Given that all the constituents of a Li-ion battery, i.e. separator, electrode, collectors and packaging, have a low elasticity, the substantial expansion of the active materials gradually places a stress on the packaging or induces a deformation thereof, depending on its rigidity.

In other words, the process of insertion and deinsertion of lithium ions induces swelling/contraction of the active materials, this generating increases in the pressure on the packaging of the accumulator depending on its state of charge.

Likewise, degradation of a constituent may generate the production of gas within the accumulator and consequently also generate increases in the pressures on the packaging.

Thus, by measuring the pressure on an accumulator packaging, it is possible to estimate the state of health of the accumulator as it ages.

The Applicant has already proposed in French patent application No. FR 13 53708 to use strain gauges as indicators of the state of health of Li-ion batteries. In this application, the pressures exerted by the interior of the Li-ion accumulator on the rigid packaging (casing) engender its deformation, which is directly measurable by a strain gauge adhesively bonded to the casing, thereby allowing indicators of the state of health of the Li-ion battery to be obtained. The measurement results disclosed in the aforementioned patent application were obtained with Li-ion accumulators comprising a rigid metal packaging to which a strain gauge had been adhesively bonded.

The inventors have observed that with conventional adhesives and conventional strain-gauge adhesive-bonding techniques, it is not possible to obtain satisfactory measurements on flexible Li-ion-accumulator packagings.

There is therefore a need to improve the measurement of the deformation of flexible lithium electrochemical accumulators, with a view to obtaining a reliable indicator of the health of accumulators.

More generally, there is a need to improve the measurement of deformation of flexible structures by overcoming the limitations of conventional adhesives and/or conventional adhesive-bonding techniques.

The aim of the invention is to at least partially meet this (these) need(s).

SUMMARY OF THE INVENTION

To do this, one subject of the invention, according to one of its aspects, is a flexible structure comprising a strain gauge that is elongate along a longitudinal axis X1 and that is intended to measure deformation of the flexible structure in a direction X parallel to the axis X1, the carrier of the gauge being adhesively bonded to the flexible structure only by its lateral ends.

In other words, contrary to the strain-gauge adhesive bonding of the prior art, which consisted in adhesively bonding the entire surface of the gauge carrier to the structure, such as to a rigid Li-ion-accumulator packaging, the adhesive bonding of the strain gauge according to the invention essentially consists in adhesively bonding only the lateral ends of the carrier.

Thus, adhesively bonding according to the invention only the ends of the gauge carrier makes it possible to avoid stiffening the surface of the flexible packaging, and therefore not to minimize the attenuation of the signal measured by the strain gauge. The adhesively bonded lateral ends thus behave as load input terminals via which the force exerted by the flexible structure is transmitted.

Preferably, each adhesive bead between the gauge carrier and flexible structure is produced over the entire length of one lateral end, i.e. over the entire width of the gauge carrier.

Advantageously, the adhesive between the gauge carrier and flexible structure is an adhesive, in the set state, having a high Young's modulus, typically higher than 5 GPa, or even a very high Young's modulus. An adhesive with a very high Young's modulus with respect to that of the flexible structure is advantageous since the deformation is not absorbed by the adhesive and transmitted directly to the strain gauge.

Again advantageously, the adhesive is chosen from the family of cyanoacrylates of general formula: $CH_2$=C (CN)—COOR, where R is a methyl, propyl, butyl, ethyl, hextyl, heptyl or octyl radical.

According to one preferred application, the flexible structure constitutes the flexible packaging of a lithium electrochemical accumulator such as a Li-ion accumulator.

A lithium electrochemical accumulator to which the invention is applicable includes at least one electrochemical cell consisting of at least one anode and one cathode on either side of an electrolyte, two current collectors one of which is connected to the anode and the other to the cathode, and a flexible packaging arranged to contain the electrochemical cell(s) with seal-tightness while being passed through by portions of the current collectors forming the poles.

Depending on the type of lithium-insertion electrode materials chosen for the constituent electrodes of an electrochemical cell according to the invention, the current collector formed by a least one metal sheet may be made of aluminum or of aluminum metallized on the surface of another metal, for example aluminum superposed on copper.

The expression "electrode made of lithium-insertion material" is here and in the context of the invention understood to mean an electrode comprising at least one lithium-insertion material and at least one binder made of polymer. Optionally, the electrode may in addition comprise an electronic conductor, for example carbon fibers or carbon black.

The expression "lithium insertion material" is, in particular for the positive electrode, understood, here and in the context of the invention, to mean a material chosen from spinal lithiated oxides containing manganese, lamellar lithiated oxides, and mixtures thereof, and polyanionic framework lithiated oxides of formula $LiM_y(XO_z)_n$ where M represents an element chosen from Mn, Fe, Co, Ni, Cu, Mg, Zn, V, Ca, Sr, Ba, Ti, Al, Si, B and Mo, and X represents an element chosen from P, Si, Ge, S and As, y, z and n being positive integers.

The expression "lithium insertion material" is also, in particular for the negative electrode, understood to mean a material chosen from: a lithiated or non-lithiated titanium oxide, for example $Li_4Ti_5O_{12}$ or $TiO_2$. More particularly, the negative electrode material may be chosen from carbonated materials, non-lithiated titanium oxides and their derivatives and lithiated titanium oxides, such as $Li_4Ti_5O_{12}$, and their derivatives, and a mixture thereof.

Preferably, the anodes are made of $Li_4Ti_5O_{12}$ and the cathodes of $LiFePO_4$.

The term "separator" is here and in the context of the invention understood to mean an electrically insulating ionic conductor formed by at least one polymeric material such as polyvinylidene fluoride (PVDF), polyvinyl acetate (PVA), polymethyl methacrylate (PMMA), polyoxyethylene (POE) or polyethylene terephthalate (PET) or a polymer chosen from polyolefins such as polypropylene, polyethylene or cellulose.

The electrolyte according to the invention may be a liquid formed by a mixture of a carbonate and at least one lithium salt. The expression "lithium salt" is preferably understood to mean a salt chosen from $LiPF_6$, $LiClO_4$, $LiBF_4$ and $LiAsF_6$.

Alternatively, the electrolyte may comprise one or more ionic liquids based on lithium ions, namely a salt formed from lithium cations complexed with organic or inorganic anions, which has the property of being liquid at room temperature. An ionic liquid, depending on the nature of the anion, may be hydrophilic or hydrophobic. By way of example of ionic liquids, mention may be made of ionic liquids based on hydrophobic anions such as trifluoromethanesulfonate ($CF_3SO_3$), bis(trifluoromethanesulfonate)imide [$(CF_3SO_2)_2N$] and tris(trifluoromethanesulfonate)methide [$(CF_3SO_2)_3C$].

Each electrode may be deposited on the electrically conductive section forming a current collector of at least one of the devices by a conventional printing or coating technique such as screen printing, rotogravure printing, flexographic printing, spray coating, etc.

Another subject of the invention, according to another of its aspects, is a method for adhesively bonding a strain gauge to a flexible structure, wherein the carrier of the gauge is adhesively bonded to the flexible structure only by its lateral ends.

DETAILED DESCRIPTION

Other features and advantages of the present invention will become more clearly apparent on reading the detailed description, which is given by way of illustration and with reference to the following figures, in which.

For the sake of clarity, the same reference 6 is used for a flexible or rigid packaging of a lithium-ion accumulator according to the prior art and a flexible packaging of a lithium-ion accumulator according to the invention in all of FIGS. 1 to 5.

A lithium-ion accumulator A according to the invention includes at least one electrochemical cell C consisting of at least one anode and one cathode on either side of an electrolyte impregnated in a separator. The anode and the cathode made of lithium insertion material may be deposited using a conventional technique in the form of an active layer on a metal sheet forming a current collector. By way of example, the anode is made of $Li_4Ti_5O_{12}$, the cathode of $LiFePO_4$ and the current-collector sheets of aluminum.

The Li-ion accumulator includes two current collectors one of which is connected to the anode and the other to the cathode of each cell C.

The flexible packaging 6 of the accumulator is arranged to contain the electrochemical cell(s) with seal-tightness while being passed through by portions of the current collectors forming the terminals (the poles).

It will be noted that the various elements according to the invention are shown only for the sake of clarity and that they are not to scale.

The terms "longitudinal" and "lateral" are to be considered in relation to the geometric shape of the strain gauge, which is elongate along a longitudinal axis X1. Thus, the two longitudinal edges of the carrier of the gauge are those that extend parallel to the longitudinal axis X1. The two lateral edges of the carrier of the gauge are those at the lateral ends and that extend orthogonally to the longitudinal axis X1.

Figure 1:
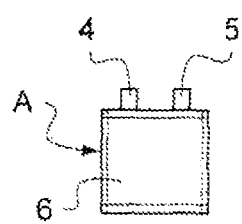
FIG. 1 is a schematic exploded perspective view showing the various elements of a lithium-ion accumulator.
Figure 2:
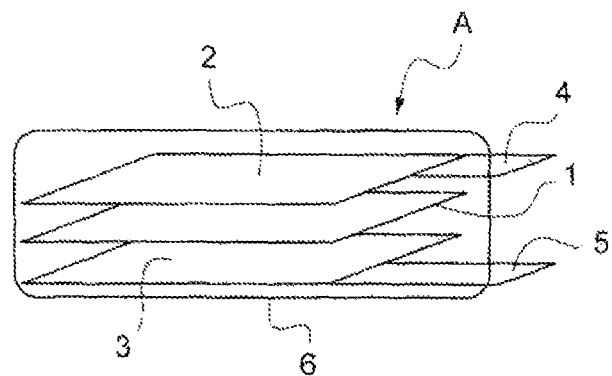
FIG. 2 is a front view showing a lithium-ion accumulator with its flexible packaging according to the prior art.

FIGS. 1 and 2 have already been commented upon in detail in the preamble. They are therefore not described below.

Figure 3:
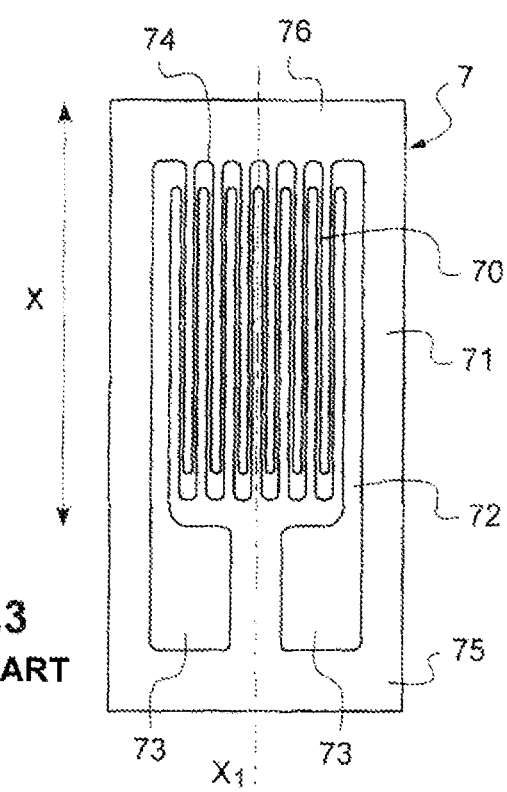
FIG. 3 is a top view illustrating a strain gauge according to the prior art.

As FIG. 3 shows, a strain gauge 7 has a shape that is elongate along a longitudinal axis X1, and consists of a very thin metal wire 70 adhesively bonded to a carrier 71 of small thickness, typically made of polyimide. The metal wire 70 is arranged in a looped shape 74, i.e. most of its length is distributed parallel to the longitudinal axis X1. Larger strands 72 serve to solder the outputs, to cables for connection to instruments (not shown), by way of pads 73 which are called measuring pads.

When it is desired to know the elongation of a structure in a given direction X, the gauge 7 is adhesively bonded with the strands parallel to this direction X. The gauge 7 is thus qualified a linear strain gauge.

Thus, when a deformation appears in the direction of the measured deformation, the length of the wire 70 is increased. A continuous measurement of the resistance of the wire, via an electrical connection of a Wheatstone bridge to the measuring pads 73, makes it possible to obtain a signal directly proportional to the linear deformation undergone by the carrier 71, according to the equation:

$$R=\rho*l/S$$

in which R is the resistance of the linear strain gauge 7, ρ the resistivity of the material, l the length of the wire 71 and S the area of the wire 71.

Figure 4:
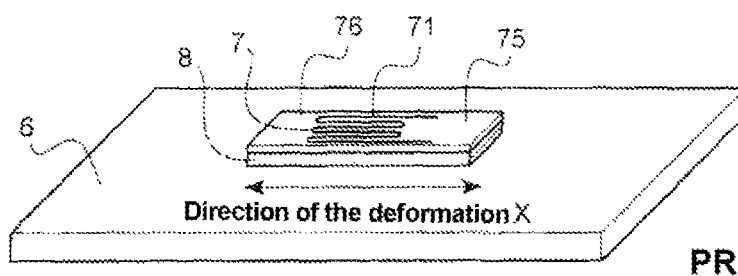
FIG. 4 is a perspective view illustrating the adhesive bonding of a strain gauge to a rigid packaging of a Li-ion accumulator according to the prior art.

FIG. 4 shows the way in which a linear strain gauge 7 was adhesively bonded to a packaging of a Li-ion accumulator in the prior art: the entire bottom surface of the gauge carrier 71 is adhesively bonded by the adhesive 8.

Up to now, the adhesives 8 envisioned for adhesively bonding strain gauges 7 to a flexible packaging were adhesives from the cyanoacrylate family because they prove to be the most effective binders as regards adherence to a polymeric material such as the polyimide of the gauge carrier 71.

Furthermore, the inventors were able to analyze the reasons why a bonding technique according to the prior art, such as shown in FIG. 4, was ineffective when it is a question of measuring the deformation of a flexible Li-ion-accumulator packaging.

Thus, cyanoacrylates have the drawback of stiffening too much when dried. Furthermore, in an adhesive-bonding configuration according to FIG. 4, the deformation undergone by the flexible packaging 6 cannot be fully measured by the gauge 7 because of an attenuation of the deformation by the cyanoacrylate adhesive 8, which is too stiff and present over the entire bottom surface of the carrier 71.

In other words, the difference in Young's modulus between the cyanoacrylate adhesive 8 and the material(s) of the flexible packaging 6 is very large and this difference is an obstacle to an effective measurement of deformation.

Figure 5:
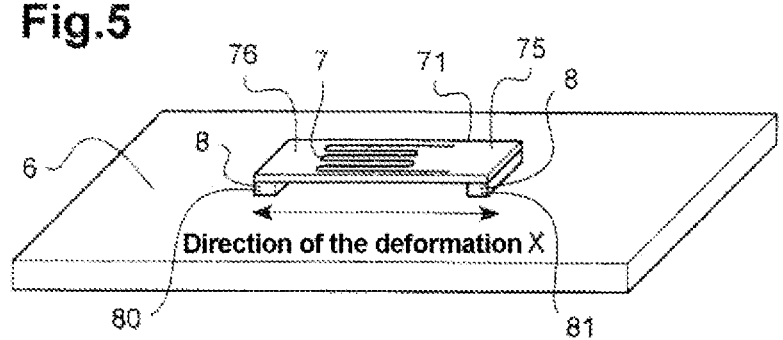
FIG. 5 is a perspective view illustrating the adhesive bonding of a strain gauge to a flexible packaging of a Li-ion accumulator according to the invention.

The inventors have thus proposed an adhesive bonding technique that is different from the prior art and that advantageously allows adhesives that are very stiff in the set state, such as cyanoacrylate adhesives, to be used FIG. 5 shows a linear strain gauge 7 adhesively bonded to a packaging of a Li-ion accumulator in a way according to the invention: only the lateral ends 75, 76 of the gauge carrier 71 are adhesively bonded, over all their length, to the flexible packaging 6 by adhesive beads 80, 81.

As may be seen in FIG. 5, contrary to the adhesive bonding technique according to the prior art, most of the bottom surface of the carrier 71 of the gauge 7, and indeed the area of the carrier 71 in which the metal wire 70 and the pads are present, is then devoid of adhesive.

Preferably, the adhesive bond is formed over at most 0.5 cm of width of each lateral end 75 and 76.

Also preferably, there is no adhesive 81 facing the measuring wire 70 of the gauge 7.

Thus, the invention consists in adhesively bonding only lateral portions 75, 76 of the carrier 71 of the gauge, i.e. only the lateral ends 75, 76 of the carrier 71, which are transverse to the axis X1, i.e. orthogonal to the direction X of the deformation. By virtue of such a partial adhesive bonding, stiffening of the adhesively bonded area of the flexible packaging 6 is avoided, and this therefore allows the attenuation of the signal measured by the gauge 7 not to be minimized. The mechanical behavior of the adhesively bonded zones 80, 81 may be likened to load input terminals via which the deformation undergone by the flexible packaging 6 is transmitted. Contrary to the adhesive bonding according to the prior art, a very high Young's modulus of the adhesive 80, 81 with respect to the flexible packaging 6 is an advantage since the deformation is not absorbed by the adhesive and transmitted directly to the gauge 7.

In order to validate the improvement in measurement performance achieved by the adhesive bonding according to the invention, the inventors carried out comparative tests.

These tests were tensile tests that were carried out on two rectangular strips of flexible Li-ion-battery packaging, of identical dimensions, namely a width of 2 cm and a length of 20 cm. The flexible packaging used for the strips was a trilayer material: one layer of polyamide, one layer of aluminum and one layer of polyethylene.

Each of the two strips was equipped with a linear strain gauge 7 as shown in FIG. 3.

More precisely:
 a strain gauge 7 was adhesively bonded to one of the two bands as in the prior art, i.e. as shown in FIG. 4, with the entire surface of the carrier 71 adhesively bonded to the flexible packaging 6; and
 a strain gauge 7 was adhesively bonded to the other of the two strips in the way according to the invention, i.e. as shown in FIG. 5, with only the lateral ends 75, 76 of the carrier 1 adhesively bonded to the flexible packaging 6.

Tensile tests were then carried out on the two bands thus equipped.

Figure 6:
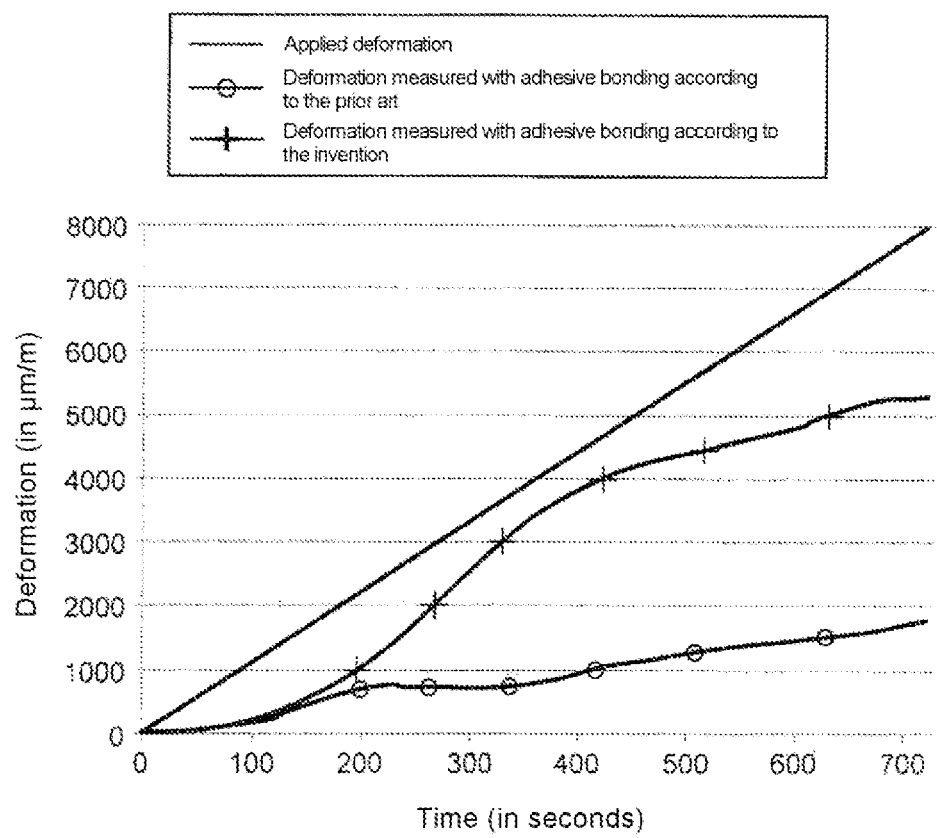
FIG. 6 shows deformation measurements, taken with linear strain gauges fitted on a Li-ion accumulator flexible packaging, for an adhesive bond according to the prior art and for an adhesive bond in accordance with the invention, respectively, during a tensile test of applied deformation rate.

The measurements of deformation as a function of tensile-test time are shown in FIG. 6 in the form of curves, in which:
 the curve drawn with the unmarked solid line shows the deformation at constant rate applied by the testing machine;
 the curve drawn with the solid line marked with circles corresponds to the signal measured by the gauge adhesively bonded according to a technique of the prior art;
 the curve drawn with the solid line marked with crosses corresponds to the signal measured by the gauge adhesively bonded using a technique according to the invention.

It is apparent from these curves that the adhesive bonding according to the invention improves, by a factor substantially equal to three, the sensitivity of a strain gauge.

The invention is not limited to the examples just described; the features of the illustrated examples may especially be combined together in variants that have not been illustrated.

The invention claimed is:

1. A flexible structure constituting a flexible packaging of a lithium electrochemical accumulator, the flexible structure comprising a strain gauge that is elongate along a longitudinal axis X1 and that is intended to measure deformation of the flexible structure in a direction X parallel to the axis X1, the carrier of the gauge being adhesively bonded to the flexible structure only by its lateral ends.

2. The flexible structure as claimed in claim 1, each adhesive bead between the gauge carrier and flexible structure being produced over the entire length of one lateral end.

3. The flexible structure as claimed in claim 1, the adhesive between the gauge carrier and flexible structure being an adhesive, in the set state, having a high Young's modulus, typically higher than 5 GPa, or even a very high Young's modulus.

4. The flexible structure as claimed in claim 1, the adhesive being chosen from the family of cyanoacrylates of general formula: $CH_2=C(CN)-COOR$, where R is a methyl, propyl, butyl, ethyl, hextyl, heptyl or octyl radical.

5. The flexible structure as claimed in claim 1, wherein the lithium electrochemical accumulator is a Li-ion accumulator.

6. The flexible structure as claimed in claim 1, wherein the flexible packaging is manufactured from a multilayer composite comprising a stack of aluminum layers covered with one or more polymer films laminated by adhesive bonding.

* * * * *